Nov. 26, 1963 R. C. WILSON 3,112,446
COMBINATION RADIO TRANSMITTER AND RECEIVER
Filed Nov. 9, 1961
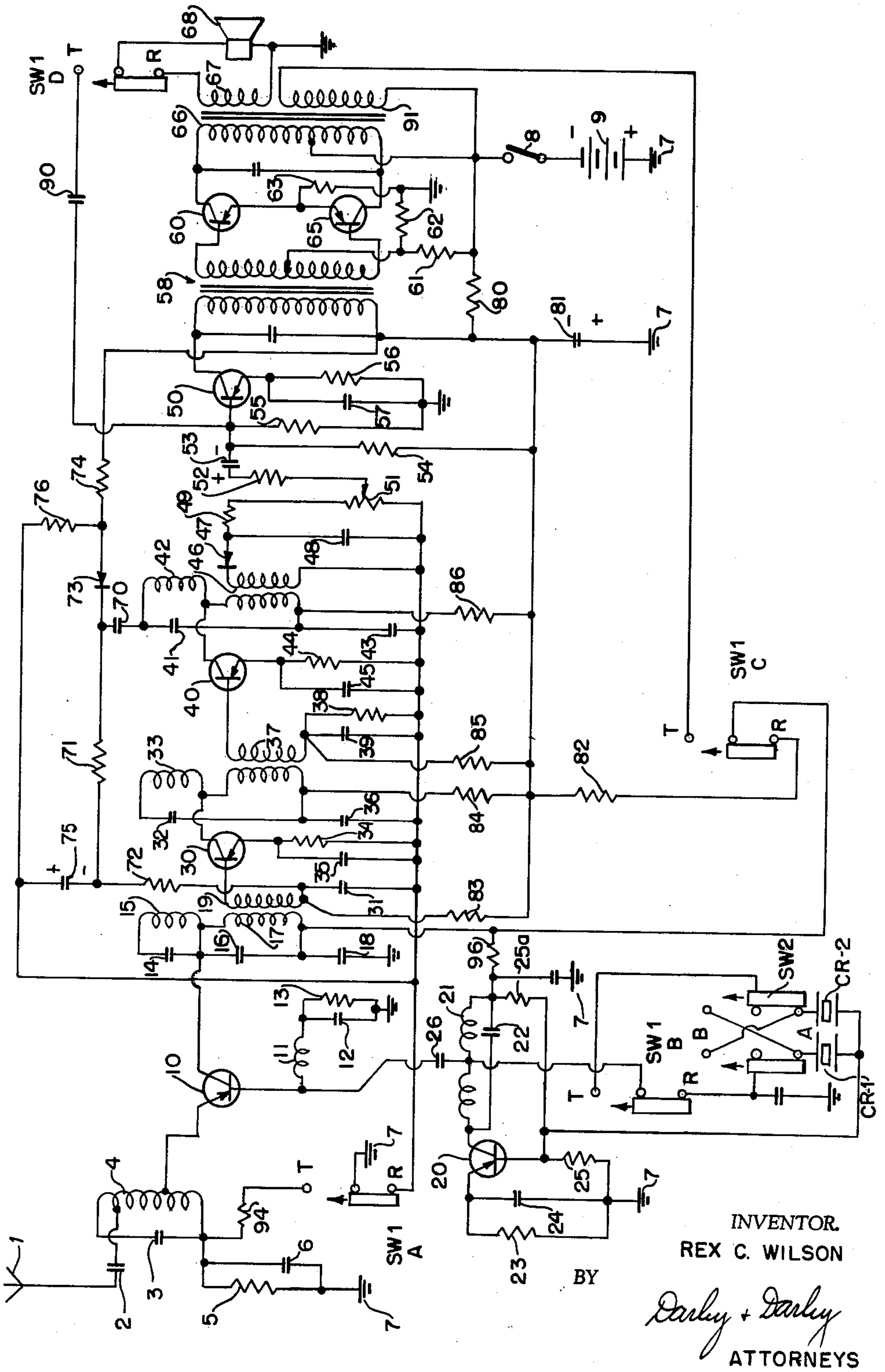
INVENTOR.
REX C. WILSON
BY
Darby + Darby
ATTORNEYS United States Patent Office 3,112,446

Patented Nov. 26, 1963

3,112,446

COMBINATION RADIO TRANSMITTER AND RECEIVER

Rex C. Wilson, Newington, Conn., assignor to Landers, Frary & Clark, New Britain, Conn., a corporation of Connecticut Filed Nov. 9, 1961, Ser. No. 151,264
8 Claims. (Cl. 325—20)

This invention relates to the general field of radio communications, and more particularly to a combination radio transmitter-receiver unit.

It is an object of this invention to provide a combination radio transmitter-receiver unit in which certain of the elements thereof are used for both transmitting and receiving functions.

Another object of this invention is to provide a combination radio transmitter-receiver in which the receiver mixer stage also operates as a modulated power amplifier for the transmitter.

A further object of this invention is to provide a combination transmitter-receiver having a common oscillator which is controlled by different crystals during transmission and reception on a particular channel, and providing for the changing of channels without changing of crystals.

It is another object of this invention to provide a combination transmitter-receiver using transistors and a common crystal controlled oscillator in which several of the transistors perform dual functions and in which the transmit-receive channel may be readily changed without using additional crystals.

Other objects and advantages of the invention will become more apparent upon reference to FIGURE 1, which is the single figure of the drawing.

In accordance with the objects of the present invention a combination transmitter-receiver is provided in which the transmitter and receiver both use a crystal controlled oscillator for accurately controlling their respective frequencies of operation on a particular channel. During receiver operation, the crystal controlled oscillator produces a stable radio frequency signal which is supplied to a mixer stage where it is heterodyned with the incoming received signal to produce a stable intermediate frequency. The intermediate frequency signal is supplied to intermediate frequency amplifiers, a demodulator, and then to an audio frequency amplifier and audio output stages in the well known superheterodyne receiver type of operation. In transmit operation, the audio frequency amplifier and the audio output stages are used as speech amplifiers to amplify the signal to be transmitted. The amplified speech signal is applied to the mixer stage, which is now operated as a power amplifier and modulator by the use of suitable circuits, and the crystal controlled oscillator provides a carrier wave signal onto which the speech signal is modulated. The crystals which are used to control the oscillator during receive and transmit operations are selected to have a frequency difference which is exactly equal to the intermediate frequency of the receiver. Provision is made to reverse the operating functions of these two crystals; i.e., from receive to transmit and from transmit to receive, while still maintaining the same frequency difference therebetween. This enables transmission and reception to occur on a different channel without the use of additional crystals.

Referring now to FIGURE 1, the combination transmitter-receiver unit has a series of switches SW1–A, SW1–B, SW1–C and SW1–D. These switches control the operation of the unit to switch it between transmit (T) and receive (R) functions and are preferably in the form of a single four-pole, double-throw switch which is controlled by a single actuating means. All of the aforesaid switches are shown in the receive (R) position and the operation of the unit is first described in this mode of operation. A separate switch 8, which is of the single-pole, single-throw type, connects a source of potential 9 to the unit for both receive and transmit operations. The switch 8 is preferably mounted on the unit's volume control.

With the unit in the receive mode of operation, a superheterodyne receiver is formed by the transistor 10 which operates as a mixer stage; transistor 20 which operates as a crystal controlled local oscillator; transistor 30 which operates as a first intermediate frequency amplifier; transistor 40 which operates as a second intermediate frequency amplifier; transistor 50 which is an audio frequency amplifier; and transistors 60 and 65 which form a conventional push-pull audio amplifier.

The received amplitude-modulated signal, which for purposes of explanation is considered to be in the frequency range of approximately 27 megacycles, is received by an antenna 1 and passes through a capacitor 2 to an upper tap on the coil of a parallel tuned resonant circuit formed by a capacitor 3 and coil 4. Coil 4 is tapped at a second point in order to feed the signal in the resonant circuit to the emitter electrode of the mixer stage 10. A resistor 5 and bypass capacitor 6 are connected between a point of reference potential, such as ground 7, and the emitter electrode of transistor 10 through the tapped portion of the coil, in order to establish emitter bias for the transistor.

The signal for heterodyning with the received signal is supplied to the base electrode of the mixer 10 from a crystal controlled oscillator 20. The oscillator 20 is of the conventional series resonant type, having a tuned circuit formed by the tapped coil 21 and parallel connected capacitor 22 in its collector circuit. The crystal is connected into the oscillator circuit through a double-pole, double-throw switch SW2, and with this switch in the A position as shown, crystal CR–1 is in series between the base electrode of transistor 20 and the tap of coil 21, thereby providing a feedback path from collector to base. As is well known, the crystal acts as a resonant circuit and a frequency determining element serves to stabilize the output frequency of the oscillator with a high degree of precision. Suitable biases for the emitter electrode of the transistor is provided by the respective paralleled resistor 23 and capacitor 24. Base bias is established by the resistors 25 and 25*a*. This oscillator is conventional in the art and no further description is necessary.

The output of the oscillator 20 is taken from the tap on the coil 21 and fed through a capacitor 26 to the base electrode of the mixer 10. The output frequency of the oscillator as controlled by crystal CR–1 is such so as to produce a sum or difference frequency signal at the output of the mixer, when heterodyned with the received signal, which is the intermediate frequency of the remainder of the receiver. Such operation is conventional in superheterodyne radio receivers. For purposes of illustration, the intermediate frequency is selected to be approximately 250 kilocycles. Of course, any suitable frequency may be used.

In order to insure stability of the mixer stage 10, the portion of the coil 4 below the lower tap and the capacitor 6 are selected so that these two components form a circuit which is series resonant at the intermediate frequency of the receiver. A similar circuit which is series resonant at the receiver intermediate frequency is formed by the radio frequency choke 11 and the capacitor 12 and is connected between the base of transistor 10 and ground. A resistor 13 is shunted across capacitor 12 in order to establish the base bias for the transistor. Both of these series resonant circuits serve to pass the receiver intermediate frequency to ground, thereby insuring stability of the mixer 10.

At the relatively high frequency produced by the oscillator 20, which illustratively is in the neighborhood of 27 megacycles, the self capacitance across the coil 11 forms a parallel resonant circuit which is resonant at the oscillator frequency. This parallel resonant circuit is desirable since it provides the best power transfer into the mixer of the energy produced by the oscillator.

The mixer 10 operates in a conventional manner and produces at its output, among others, signals of a frequency equal to the sum and the difference between the received carrier wave signal and the oscillator signal. One of these sum or difference signals is selected and is called the intermediate frequency signal. The intermediate frequency signal is, in turn, amplified and demodulated to recover the audio information from the received signal.

The output from the collector of transistor 10 is supplied to a parallel resonant circuit which selects the intermediate frequency signal. This circuit is formed by the series connected capacitors 14 and 16 and the series connected coils 15 and 17, the latter forming the primary winding of an intermediate frequency transformer whose secondary is coil 19. Capacitor 14 and coil 15 and capacitor 16 and coil 17 are connected together at their ends to form the resonant circuit, as shown, and the junctions of the two capacitors and two coils are shorted together by a jumper wire. A bypass capacitor 18 is connected from the end of capacitor 16 to ground. The capacitors 16 and 18 bypass the high frequency received carrier wave, the high frequency signal produced by oscillator 20, and the sum of these two signals to ground. Therefore only the receiver intermediate frequency is left in the parallel resonant circuit formed by elements 14–17.

An examination of the resonant circuit shows that each of the elements 14–17 forms one arm of a bridge circuit. Two of the corners of the bridge are shorted together, as shown. While this arrangement would appear to prevent the operation of the resonant circuit, such is not the case since the values of the capacitors 14 and 16 and coils 15 and 17 are selected to allow signal transmission through the bridge. This is accomplished by selecting the values of capacitor 14 and coil 15 to produce respective capacitive and inductive reactances which cancel each other at the intermediate frequency. Similarly, the values for the capacitor 16 and coil 17 are selected so that their reactances also cancel at the intermediate frequency. Therefore, at the intermediate frequency a balanced bridge exists and no current flows in the wire which shorts the circuit. This means that the circuit is not effectively shorted at the intermediate frequency and therefore the signal can be developed in the resonant circuit during receive operations and coupled out to other circuits. It should be recognized that the capacitors 14 and 16 could be combined into a single capacitor. However, the use of the two capacitors achieves the result of providing a low D.C. resistance path from the collector of transistor 10 to the power supply while also providing an effective bypass for the radio frequency energy at the same time.

The intermediate frequency from the resonant circuit 14–17 is coupled into the secondary winding 19 of the transformer. The upper end of this winding is connected to the base electrode of transistor 30 and the other end connected to a capacitor 31 and through switch SW1–A to ground 7 to bypass the base. The transistor 30 is an intermediate frequency amplifier and has a parallel resonant circuit formed by a capacitor 32 and tapped transformer primary winding 33 in the collector output. The resonant circuit is tuned to the intermediate frequency and the collector of the transistor is connected to the tap on the coil 33. The resonant circuit 32—33 is also bypassed to ground through a capacitor 36. Emitter bias is established for the transistor 30 by resistor 34 and bypass capacitor 35.

The intermediate frequency signal in the resonant circuit 32—33 is coupled through the transformer secondary winding 37 to the base electrode of transistor 40 which is a second intermediate frequency amplifier stage similar to the one previously described. Coupling is preferably accomplished by the lower section of winding 33 in a well-known manner. A resistor 38 and bypass capacitor 39 are connected through the transfer winding 37 to the base electrode to establish a bias potential therefor.

The collector output circuit for transistor 40 is a parallel resonant circuit formed by capacitor 41 and intermediate frequency transformer primary winding 42, which is similar to that in the collector circuit of transistor 30. This parallel resonant circuit is also tuned to the intermediate frequency. Emitter bias for transistor 40 is supplied through a resistor 44 in parallel with a bypass capacitor 45.

The intermediate frequency signal is coupled into the transformer secondary winding 46, one end of which is connected to ground. The undergrounded end of the transformer secondary 46 is connected to diode 47 which, in conjunction with capacitor 48, resistor 49 and potentiometer 51, demodulates the audio information from the intermediate frequency signal. This demodulator circuit is conventional in the art and no further description is needed.

The resistor 51 functions as a volume control to tap off a desired amount of the demodulated signal and supplies the demodulated signal through a resistor 52 and capacitor 53 to the base electrode of the audio frequency amplifier stage 50. The base electrode bias for the transistor 50 is supplied from the source 9 through a voltage divider formed by the resistors 54 and 55. Emitter bias is established by the resistor 56 and the parallel connected audio bypass capacitor 57.

The transistor 50 amplifies the applied audio signal and applies it to the primary winding of the transformer 58. The secondary winding of transformer 58 is center tapped and the push-pull amplifier formed by transistors 60 and 65 have their respective base electrodes connected to the opposite ends of the transformer secondary winding. The collector electrodes of the transistors 60 and 65 are connected to opposite ends of the primary winding of an output transformer 66. Base bias for transistors 60 and 65 is supplied from the source 9 through a voltage divider formed by resistors 61 and 62 and through the secondary winding of transformer 58. The emitter electrodes of these two transistors are connected together and returned to ground through resistor 63. Collector bias is provided to each transistor directly through the primary winding of transformer 66.

The signal appearing across the primary of transformer 66 is coupled into a secondary winding 67 which drives a speaker 68. In the preferred form of the invention, speaker 68 is of the permanent magnet type, but of course, other suitable types may be utilized.

An automatic volume control circuit is also provided by the capacitor 70 which taps a portion of the signal out of the resonant circuit 41—42 of transistor 40. The automatic volume control signal is applied through resistors 71 and 72 and the winding 19 to the base electrode of transistor 30. Capacitor 75 is a filter capacitor for the automatic volume control circuit. The automatic volume control functions in the conventional manner and keeps the overall gain of the receiver at a substantially constant level in the presence of different amplitude received signals. The automatic volume control also has a delay circuit formed by the diode 73, and the voltage divider network formed by resistors 74 and 76 which applies a delay voltage to the diode. The purpose of the delay circuit is to prevent the automatic gain control from operating below a certain level of received signal. This operation is also conventional.

In order to complete the description of the circuit as shown, the connections to the potential source 9 are described. Voltage from the source 9 is applied to a resistor 80 and a filter capacitor 81 is connected from one end thereof to ground. Collector potential is applied to mixer stage 10 from the junction of resistor 80 and capacitor 81, through resistor 82, switch SW1–C and transformer coil 17. Base bias is supplied to transistor 30 through resistor 83 and transformer coil 19 while collector bias is supplied to the same transistor through resistor 84 and the lower section of winding 33. Bias is applied to the base electrode of transistor 40 through resistor 85 and transformer winding 37, and collector potential is applied through resistor 86 and the lower section of winding 42. The bias for the base of transistor 50 is supplied through the voltage divider network formed by resistors 54 and 55. In receive operation, the collector of oscillator 10 receives its potential through resistor 82, switch SW1–C and resistor 96.

When switch SW–1 is thrown to the transmit position, shown by "T" on the diagram, the speaker 68 operates as a microphone. The signal which is produced at the voice coil of the speaker in response to the speech information is now coupled through switch SW1–D and capacitor 90 to the base electrode of transistor 50. Transistor 50 now functions as a speech amplifier whose output is applied to the push-pull transistors 60 and 65 which also operate as speech amplifiers. The signal on the primary of transformer 66 is coupled to a secondary winding 91 and applied through switch SW1–C to the junction of capacitor 18 and tuned resonant circuit 14–17 in the collector of transistor 10. The collector bias for transistor 10 is now applied directly through the output transformer secondary winding 91, switch SW1–C and coil 17 of the resonant circuit. This places a higher collector bias on the transistor than is present during the receive mode of operation.

In the transmit mode of operation, the transistor 10 operates as a power amplifier and modulator (or mixer). The carrier wave signal from the oscillator 20 is applied to the base electrode of transistor 10. With switch SW1–B in the transmit position and SW2 still in the A position, crystal CR–2 now controls the frequency of operation of the oscillator circuit. The frequency of CR–2 is that of the channel of operation, which is the same as the frequency of the incoming signal in the usual case. Here, again, the radio frequency choke 11 and its distribution self-capacity form a parallel resonant circuit which maximizes the power transferred from the oscillator to the modulator-power amplifier 10.

In the transmit mode of operation the transistor 10 functions as an emitter-follower. Switch SW1–A connects the emitter electrode through the tapped portion of coil 4 and a resistor 94 which is connected to ground 7 through switch SW1–A and bypassed by capacitor 6. Resistor 94 is of a low value as is typical with emitter-follower stages.

The amplified voice (modulating) signal from transformer winding 91 is applied through the switch SW1–C and coil 17 directly to the collector of transistor 10. The values of the series connected capacitors 16 and 18 are selected, so that collector of transistor 10 is bypassed, effectively grounding it during transmission to high radio frequencies, such as those produced by oscillator 20. Therefore, the transistor 10 operates as an emitter-follower receiving a carrier wave radio signal on its base and a modulating voice frequency signal on its collector.

The transistor 10 serves to amplify and to mix the two signals which are applied thereto. This is accomplished by the voice modulating signal applied to the collector which increases or decreases the collector voltage, thereby varying the gain of the transistor accordingly. In this manner, modulation is accomplished. Since transistor 10 is operated as an emitter-follower there is no voltage amplification but the overall signal is modulated and power amplified. Additional modulation is supplied to the oscillator 20 through resistor 96, so that the outputs of both the transistor 10 and the oscillator 20 are amplitude modulated. This arrangement is desirable and it allows for linear modulation by the transistor 10.

The output of the transistor 10 is taken from the emitter and applied to the tuned resonant circuit 3—4, which now serves as the antenna tank circuit. The signal is taken from the tuned circuit via the upper tap and passed through the capacitor 2 for transmission through the antenna 1.

It should be noted that transistor 10 is capable of two-way operation. During receive operation, the incoming signal is applied to the emitter electrode and is heterodyned with the local oscillator signal to produce the intermediate frequency. During transmit operation, the speech signal is applied to the collector electrode and modulated onto the carrier wave produced by the oscillator 10. This two-way operation is made possible mainly by the special type resonant circuit 14–17.

As pointed out above, with SW–2 in the A position, crystal CR–1 controls the oscillator 20 to produce a frequency which is different from the received signal by an amount equal to the receiver intermediate frequency. Crystal CR–2 oscillates at the same frequency as the received signal for transmitting operation by the unit. In a preferred embodiment of the invention, the receiver intermediate frequency is selected to be equal to the frequency difference between two channels within the frequency band in which the transmitter-receiver operates. For example, if the unit is to be operated in the so-called "Citizens' Band," channel 2 of this band is at 26.975 megacycles and channel 22 is 27.225 megacycles. This gives a frequency difference of 250 kilocycles, which is the selected intermediate frequency. Therefore in the receive mode of operation with switch SW2 in position A, and with the unit operating in conjunction with another receiver-transmitter unit on channel 2, crystal CR–1 would be cut for the frequency of 27.225 megacycles. With the oscillator 10 producing 27.225 megacycles and the received signal being at 26.975 megacycles, the output of the mixer 10 is the 250 kilocycle intermediate frequency signal. In this case, crystal CR–2, which is used for transmitting, is selected for channel 2, i.e., 26.975 megacycles.

In some instances it may be desirable to change channels, for example, when there is noise present on one channel or another station is operating thereon. This is accomplished readily in the present circuit by moving switch SW–2 from position A to position B. Now, crystal CR–1 is used for transmitting operation and produces an output frequency for channel 22 of 27.225 megacycles. When the receiver picks up signals on this channel, crystal CR–2 is in the circuit and produces a frequency of 26.975 megacycles. When this is heterodyned in the mixer with the incoming channel 22 signal, the required 250 kilocycle intermediate frequency signal is again produced. Therefore, two crystals are all that is needed to produce both crystal controlled receiver and transmitter operation on two channels. In the normal circuit, four crystals would be needed to produce the same operation as two channels. While certain frequencies have been illustratively used as examples to illustrate the channel switching, it should be recognized that any suitable channels may be selected in accordance with the principles herein described. It is only necessary to make the receiver intermediate frequency equal to the difference between the two channels.

It should be recognized that the transmitter-receiver unit of the present invention provides many advantages. For example, transistors 10 and 20 are necessarily of the high frequency type, which are more costly than the normal audio frequency transistors. In accordance with the invention, both of these transistors are used dually in transmitter and receiver functions. This is clearly a decided and desirable economy. The circuit also allows for the use of a modulated power amplifier output in a combination transmit-receive unit while using a minimum number of transistors. The present circuit also needs only a minimum amount of switching and a minimum amount of coils for the oscillator, mixer, and antenna output coils. For example, there is no switching required at the output of the mixer 10 for transmit or receive and the same coils are used for both operations; there is no switching of coils for the oscillator circuit 20; and there is no switching of the antenna coil 4, or necessity for a separate antenna coil for transmitting purposes.

Therefore, it can be seen that a combination transmitter-receiver has been provided which is relatively simple and economical in construction and which also is capable of diversified operation and easy channel switching without use of additional crystals. While various circuits have been shown, some of which are conventional in the art, using transistors of the PNP type, it should be recognized that the principles of the invention may be extended for use with other types of semiconductor devices and also with vacuum tubes. Further, while the invention has been described illustratively as being used at a particular frequency of operation and with a particular intermediate frequency for the receiver, it should be recognized that any suitable frequencies may be used upon proper selection of the various circuit components. The principles of the present invention may also be applied to frequency modulation (FM) transmissions as well as with other types of transmissions if the proper type of demodulation is used. As used in the claims, the term speech signal therefore means any intelligence signal which modulates the carrier wave, either by amplitude, frequency or other type of modulation.

While preferred embodiments of the invention have been described above, it will be understood that these are illustrative only, and the invention is to be limited solely by the appended claims.

What is claimed is:

1. A dual purpose stage for operation as a mixer during receiver operation and as a modulator power amplifier during transmitter operation comprising amplifying means having input electrodes and an output electrode, first means for applying a received signal to an input electrode, second means for applying a local oscillator signal to an input electrode, third means connected to said output electrode for producing the intermediate frequency signal formed by the heterodyning action of said amplifying means during receiver operation, said third means comprising a bridge type parallel resonant circuit formed by two connected circuits which are series resonant at the intermediate frequency and a short circuit between the ends of said two series resonant circuits, means for applying a speech signal to be transmitted to one of said series resonant circuits of said third means, said speech signal being modulated by said amplifying means on a carrier wave signal applied to an input electrode by said second means and the modulated carrier wave signal appearing on said first means.

2. A dual purpose stage as set forth in claim 1 in which means are connected to said second means to optimize the power transfer of said local oscillator signal and said carrier wave signal to the input electrode.

3. A dual purpose stage as set forth in claim 1 in which the receiver intermediate frequency is approximately equal to the difference in frequency between the local oscillator and the carrier wave signals.

4. A dual purpose stage for operation as a mixer during receiver operation and as a modulator power amplifier during transmitter operation comprising a semi-conductor device having respective first and second input electrodes and an output electrode, first means for applying a received signal to said first input electrode, second means for applying a local oscillator signal to said second input electrode, third means connected to said semi-conductor output electrode for producing the intermediate frequency signal formed by the heterodyning action of said semiconductor during receiver operation, said third means comprising a bridge type parallel resonant circuit formed by two connected circuits which are series resonant at the intermediate frequency and a short circuit between the ends of said two series resonant circuits, means for applying a speech signal to be transmitted to one of said series resonant circuits of said third means, said speech signal being modulated by said semiconductor device on a carrier wave signal applied to said second input electrode by said second means and the modulated carrier wave signal appearing at said first input electrode and at said first means.

5. A dual purpose stage for operation as a mixer during receiver operation and as a modulator power amplifier during transmitter operation comprising amplifying means having input electrodes and an output electrode, first means for applying a received signal to an input electrode, second means for applying a local oscillator signal to an input electrode, third means connected to said output electrode for producing the intermediate frequency signal formed by the heterodyning action of said amplifying means during receiver operation, said third means comprising a bridge type parallel resonant circuit having first and second circuits including a capacitor, said first and second circuits being respectively series-resonant at the receiver intermediate frequency, means forming the center arm of the bridge for electrically connecting said series-resonant circuits, said center arm being connected to said output electrode of said amplifying means, a bypass capacitor connected between a point of reference potential and in series with one of the capacitors of a series-resonant circuit, said bypass capacitor and said one capacitor of said series-resonant circuit bypassing signals having a frequency above the receiver intermediate frequency to said point of reference potential, means for applying a speech signal to be transmitted to one of said series-resonant circuits, said speech signal being applied to the output electrode of said amplifying means by said center arm and being modulated by said amplifying means on a carrier wave signal applied to an input electrode by said second means, the modulated carrier wave signal appearing on said first means, and said one capacitor and said bypass capacitor bypassing said carrier wave signal to said point of reference potential.

6. A dual purpose stage for operation as a mixer during receiver operation and as a modulator power amplifier during transmitter operation comprising a semiconductor device having respective first and second input electrodes and an output electrode, first means for applying a received signal to said first input electrode, second means for applying a local oscillator signal to said second input electrode, third means connected to said semi-conductor output electrode for producing the intermediate frequency signal formed by the heterodyning action of said semiconductor during receiver operation, said third means comprising a bridge type parallel resonant circuit having first and second circuits including a capacitor, said first and second circuits being respectively series-resonant at the receiver intermediate frequency, means forming the center arm of the bridge for electrically connecting said series-resonant circuits, said center arm being connected to said output electrode of said semiconductor device, a bypass capacitor connected between a point of reference potential and in series with one of the capacitors of a series-resonant circuit, said bypass capacitor and said one capacitor of said series-resonant circuit bypassing signals having a frequency above the receiver intermediate frequency to said point of reference potential, means for applying a speech signal to be transmitted to one of said series-resonant circuits, said speech signal being applied to said output electrode by said center arm and being modulated by said semiconductor device on a carrier wave signal applied to said second input electrode by said second means, the modulated carrier wave signal appearing at said first input electrode and at said first means, and said one capacitor and said bypass capacitor bypassing said carrier wave signal to said point of reference potential.

7. In a unit for receiving a signal and for transmitting a speech signal the combination comprising oscillator means, first and second frequency determining elements adapted to be connected to said oscillator means for controlling the same to produce first and second signals having respective first and second frequencies, first means adapted for operation as a mixer stage during receiving and as a modulator power amplifier during transmitting, means for connecting said first frequency determining element to said oscillator means during receiving operation thereby causing said oscillator means to produce said first signal and for applying said first signal to said first means, means for applying said received signal to said first means for heterodyning with said first signal to produce an intermediate frequency signal, output means corrected to said first means to produce said intermediate frequency signal, said output means comprising a bridge type parallel resonant circuit having first and second circuits including a capacitor, said first and second circuits being respectively series-resonant at the receiver intermediate frequency, means forming the center arm of the bridge for electrically connecting said series-resonant circuits, said center arm being connected to said first means, a bypass capacitor connected between a point of reference potential and in series with one of the capacitors of a series-resonant circuit, said bypass capacitor and said one capacitor bypassing signals having a frequency above the receiver intermediate frequency to said point of reference potential, means for connecting said second frequency determining element to said oscillator means during transmitting operation thereby causing said oscillator means to produce said second signal, means for applying said second signal to said first means, means for applying the speech signal to be transmitted to one of said series resonant circuits, said speech signal being applied to said first means by said center arm, said first means modulating said second signal with said speech signal to produce an amplitude modulation carrier wave, and said one capacitor and said bypass capacitor bypassing said second signal to said point of reference potential.

8. In a unit for receiving a signal and for transmitting a speech signal the combination comprising oscillator means, first and second frequency determining elements adapted to be connected to said oscillator means for controlling the same to produce first and second signals having respective first and second frequencies, first means adapted for operation as a mixer stage during receiving and as a modulator power amplifier during transmitting, means for connecting said first frequency determining element to said oscillator means during receiving operation thereby causing said oscillator means to produce said first signal and for applying said first signal to said first means, for heterodyning with said first signal to produce an intermediate frequency signal, said intermediate frequency signal having a frequency approximately equal to the frequency difference between said first and second signals, output means connected to said first means to produce said intermediate frequency signal, said output means comprising a bridge type parallel resonant circuit having first and second circuits including a capacitor, said first and second circuits being respectively series-resonant at the receiver intermediate frequency, means forming the center arm of the bridge for electrically connecting said series-resonant circuits, said center arm being connected to said first means, a bypass capacitor connected between a point of reference potential and in series with one of the capacitors of a series-resonant circuit, said bypass capacitor and said one capacitor bypassing signals having a frequency above the receiver intermediate frequency to said point of reference potential, means for connecting said second frequency determining element in said oscillator means during transmitting operation thereby causing said oscillator means to produce said second signal, means for applying said second signal to said first means, means for applying the speech signal to be transmitted to one of said series resonant circuits, said speech signal being applied to said first means by said center arm, said first means modulating said second signal with said speech signal to produce an amplitude modulated carrier wave, said one capacitor and said bypass capacitor bypassing said second signal to said point of reference potential, and switching means for reversing the operation of said first and second frequency determining elements whereby said first frequency determining element is connected to said oscillator means during transmitting operation and said second frequency determining element is connected to said oscillator means during receiving operation.

References Cited in the file of this patent

UNITED STATES PATENTS

| | | |
|---|---|---|
| 1,502,813 | Espenschied | July 29, 1924 |
| 2,533,493 | Mitchell | Dec. 12, 1950 |